United States Patent [19] [11] 4,260,995
Strauss [45] Apr. 7, 1981

[54] SLIDE WIRE ASSEMBLY

[75] Inventor: Willard R. Strauss, St. Paul, Minn.

[73] Assignee: Honeywell Inc., Minneapolis, Minn.

[21] Appl. No.: 22,690

[22] Filed: Mar. 22, 1979

[51] Int. Cl.³ ............................................. G01D 3/08
[52] U.S. Cl. ....................................... 346/32; 324/100; 338/137
[58] Field of Search ............................. 346/32, 17, 25; 338/137, 118, 134, 14, 47; 318/668, 667; 324/100, 99 R

[56] References Cited

U.S. PATENT DOCUMENTS

| | | | |
|---|---|---|---|
| 2,442,630 | 6/1948 | Wickesser | 338/14 |
| 2,626,379 | 1/1953 | Nickells | 338/137 X |
| 2,715,209 | 8/1955 | Williams | 324/99 R |
| 2,758,279 | 8/1956 | McCarron | 324/98 |
| 2,792,542 | 5/1957 | Robinson | 318/668 |
| 2,830,453 | 4/1958 | Jones | 73/360 |
| 2,866,877 | 12/1958 | Russell | 338/168 |
| 3,030,598 | 4/1962 | Cerny | 338/41 |
| 3,449,670 | 6/1969 | Stone | 324/99 R |
| 3,787,828 | 1/1974 | Hasebe | 346/32 X |

Primary Examiner—Joseph W. Hartary
Attorney, Agent, or Firm—Laurence J. Marhoefer; Lockwood D. Burton; Mitchell J. Halista

[57] ABSTRACT

A slide-wire assembly has a first and a second separately movable contact arranged to engage a semicircular wire-wound resistance element or slide-wire. Clam shell halves of a molded case enclosing the slide-wire assembly are arranged to support the resistance element and a motor drive for one of the slide-wire contacts. The first slide-wire contact is supported on a separately movable element coaxial with a motor drive output shaft but restrained from movement therewith while providing a respective contact adjustment capability. A flexible coupling between the motor output shaft and the driven slide-wire contact enables the molded case to align the contact to apply a contact pressure in a first direction to the second slide-wire contact. Concurrently, molded ears on the concentric support for the first slide-wire contact cooperate with an adjacent inside surface of the clam shell case to provide a pressure on the second slide-wire contact in a second direction to maintain its engagement with the slide wire element.

9 Claims, 7 Drawing Figures

SLIDE WIRE ASSEMBLY

BACKGROUND OF THE INVENTION

1. Field of the Invention

The present invention relates to electrical transducers. More specifically, the present invention is directed to a slide wire assembly.

2. Description of the Prior Art

A slide-wire assembly which function as a rheostat or voltage divider to vary an electrical resistance or to provide a variable output signal from a resistance element, i.e., slide-wire, contacted by a slide-wire brush or sliding contact have been used to provide electrical measurements of mechanical displacement, e.g., the slide-wire transducer shown in U.S. Pat. No. 2,866,877. Such measuring, or transducer, slide-wire elements have been actuated or driven by a measuring network which includes a motor drive for the slide-wire brush to rebalance the slide-wire while concurrently driving a recording pen for recording the reblance operation, e.g., the measuring and recording system shown in U.S. Pat. No. 2,792,542. In order to provide accurate performance under widely varying adverse physical conditions there is a need for a slide-wire assembly which is capable of operating with precision under vigorous environmental conditions while still affording an economical structure capable of being produced by an assembly line manufacturing process at a low cost whereby a device such as a recorder incorporating such a slide-wire assembly may also have an ultimate low cost. The slide-wire assembly, therefore, must be compact and use a minimum number of parts, require a minimum of space while at the same time functioning with the required degree of precision that is normally encountered in typical slide-wire service. Such conditions include temperature variations, mechanical shocks, high frequency vibrations and other deleterious conditions. In order to attain the degree of precision required, the contact or brush which slides over a wire wound resistor of the slide-wire assembly must maintain continuous contact therewith a substantially uniform contact pressure to have a uniform and predictable variation in the output of the slide-wire assembly. Further, the assembly and adjustment of such a slide-wire assembly must be simple and require a minimum of parts in order to maintain the aforesaid low cost product characteristic. Additionally, inasmuch as the usual application for such a slide-wire assembly includes the need for a separately adjustable set-point potentiometer or rheostat, a greater saving in the product cost can be effected if the set-point slide-wire is incorporated in the same assembly with the aforesaid measuring slide-wire. Such a combined assembly must exhibit the same performance characteristics and manufacturing economies discussed above in order to produce a lost cost and acceptable ultimate product, e.g., a recorder.

SUMMARY OF THE INVENTION

An object of the present invention is to provide an improved slide-wire assembly capable of precision operation while having a simple and compact structure.

Another object of the present invention is to provide an improved dual slide-wire assembly capable of precise and independent operation of each slide-wire.

In accomplishing these and other objects, there has been provided, in accordance with the present invention a slide-wire assembly including a resistor member, or slide-wire, a pair of slide-wire contact brush support arms mechanically linked to respective drive means for moving the corresponding arms and a resilient type contact brush member on each arm engaging respective sides of the slide-wire. The brush support arms are pivotally mounted on a common axis with a first arm being linked by a flexible coupling to a motor drive while the second arm is arranged to be selectively positioned by a manually operated drive system. A clam shell envelope structure enclosing the slide-wire assembly is arranged to apply a pressure to the first arm in a first direction to press its associated contact brush against the slide-wire and to position the second arm on the flexible coupling in a direction to apply a contact pressure in a second direction opposite to the first direction to press its contact brush against the slide-wire.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
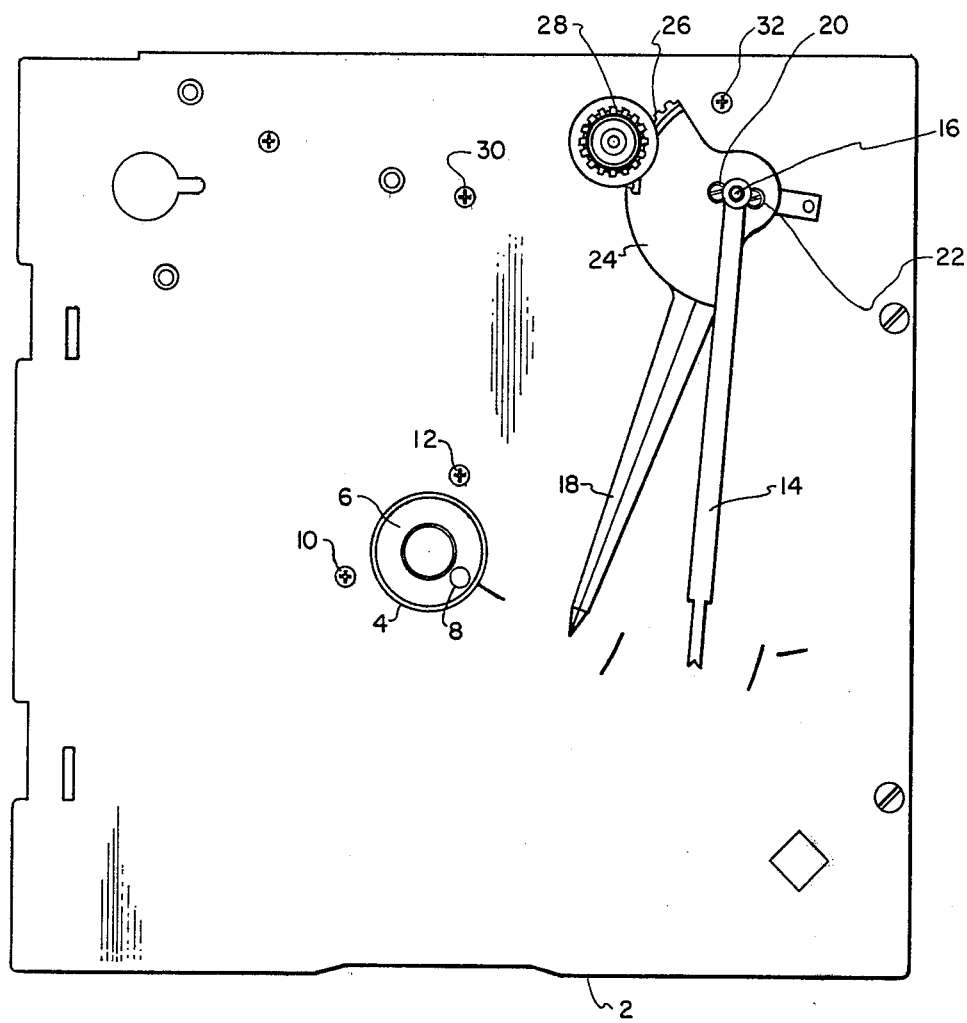
FIG. 1 is a front view of a recorder utilizing a dual slide-wire assembly embodying the present invention.

Referring to FIG. 1 in more detail, there is shown a front view of a recorder utilizing an example of a dual slide-wire embodiment of the present invention. While the mechanical structure of the recorder is shown in FIG. 1 and the other drawings, the recorder may utilize an electrical circuit for sensing and driving the slide-wire such as that shown in U.S. Pat. No. 2,792,542. Such a circuit would provide a driving signal to the slide-wire assembly to rebalance a bridge circuit being supplied with an input signal while concurrently positioning a recording stylus on a recording chart to provide a record of the position of a slide-wire contact which is moved during the rebalance operation. A second slide-wire element is adjusted manually to provide a set-point, or reference, condition of the bridge circuit which is compared with the input signal during the rebalance operation with the driven slide-wire. The second slide-wire element can be connected to a pointer positioned adjacent to a scale providing a visible indication of the set-point value. The slide-wire assembly embodying the present invention is capable of being utilized to provide such a dual slide-wire structure and operation.

The recorder may include a mounting plate 2 having holes drilled therein for mounting the various components of the recording medium drive and the recording pen and slide-wire assembly. A recording chart drive 4 is centrally located on the mounting plate 2 and includes a turntable 6 for mounting a circular recording chart (not shown) and a drive pin 8 on the turntable 6 for driving the circular chart. A pair of mounting screws 10, 12 are used to attach the chart drive to the mounting plate 2. A recording stylus (not shown), e.g., an ink pen, is mounted on the outer end of a recording arm 14 which is connected at by any suitable means at its other end to a drive shaft 16 driven by a slide-wire drive motor as hereinafter discussed. A manually adjustable set-point indicator arm 18 is mounted on the slide-wire assembly with a free end adjacent to the circular chart by a pair of mounting screws 20, 22 passing through an attached flange 24. The flange 24 has gear teeth 26 located on the periphery of one edge of the flange 24. A set-point adjusting knob 28 which is rotatably mounted on the plate 2 has external gear teeth (not shown) meshing with the teeth 26 for adjusting the angular position of the set-point arm 18 and the set-point slide-wire arm attached thereto as hereinafter discussed. A pair of mounting screws 30, 32 pass through the plate 2 for attaching the slide-wire assembly on the back of the mounting plate 2 as shown in FIG. 2.

Figure 2:
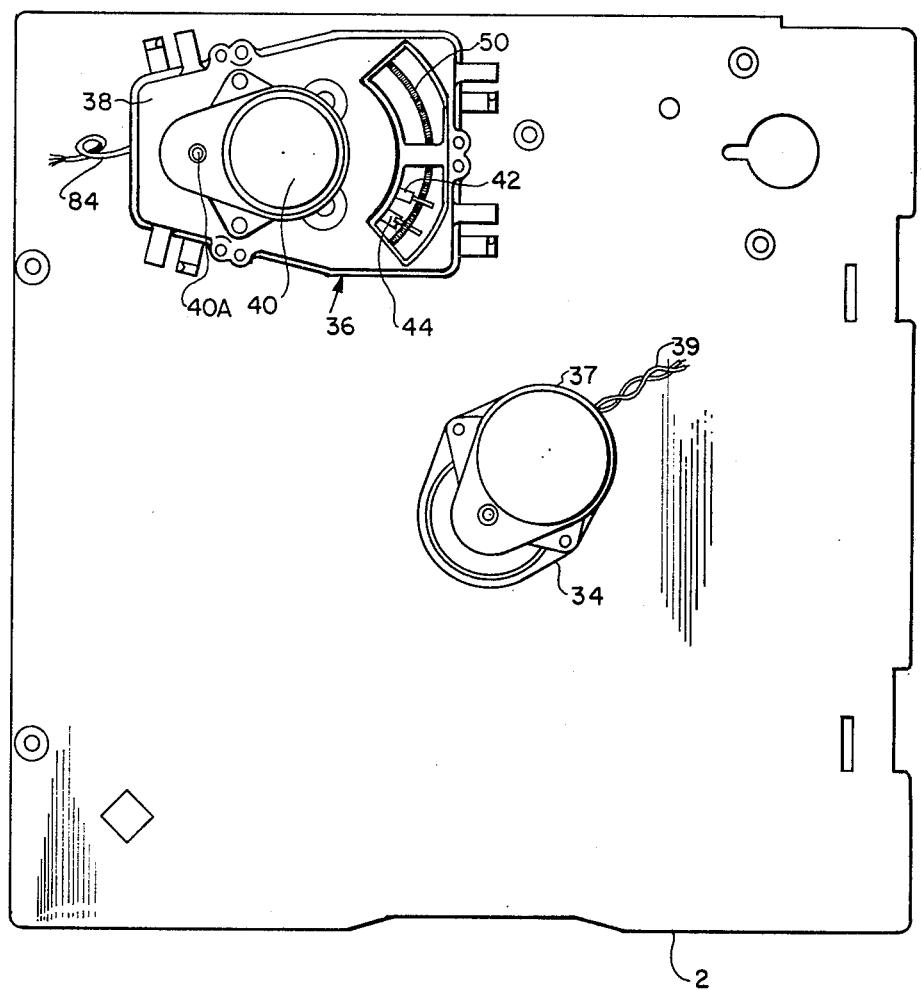
FIG. 2 is a rear view of the recorder shown in FIG. 1.

Referring now to FIG. 2, there is shown a back view of the mounting plate 2 with a chart drive motor and gear train assembly 34 and a slide-wire assembly 36 mounted thereon. The chart drive assembly includes a drive motor 37 having electrical connections (not shown) for energizing the drive motor 2 to drive the recording chart. The slide-wire assembly 36 has a drive motor assembly 40, which may include an electrical motor and a speed reducing gear train, having electrical connections (not shown) for energizing the drive motor assembly 40 to drive an output shaft 40A connected to a variable slide-wire arm 42 to move a contact brush on a slide-wire resistance element 50. A set-point slide-wire arm 44, on the other hand, is driven or positioned, by the adjusting knob 28 previously discussed. The slide-wire assembly 36 includes an enveloping and supporting housing arranged in two halves, e.g., outer half 38, which for economy of manufacture are interchangeable. The housing for the slide-wire assembly would preferably be cast from a suitable electrically insulating and structurally rigid plastic material, such materials being well-known in the art. The two halves of the housing are arranged to mate with each other and are secured with suitable fastening means, e.g., rivets, screws, solvent, etc.

Figure 3:
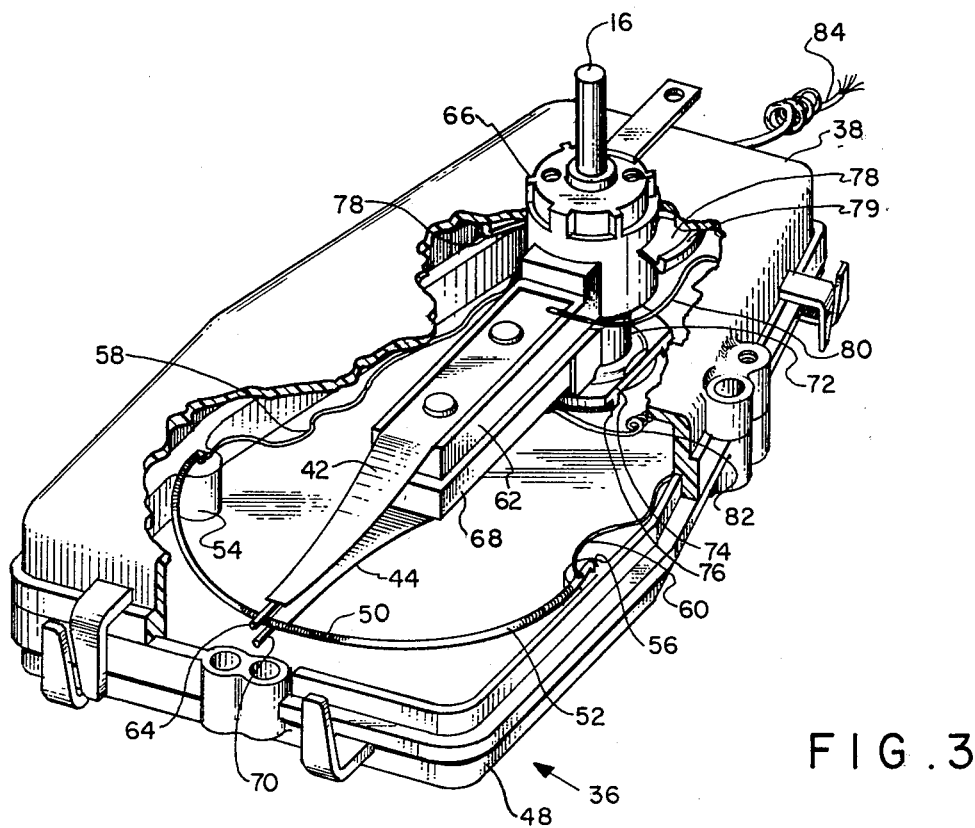
FIG. 3 is an isometric view partially in cross-section of a dual slide-wire assembly suitable for use in the recorder shown in FIGS. 1 and 2.

Referring to FIG. 3 in more detail there is shown an isometric view in partial cut away of the slide-wire assembly 36. The slide-wire assembly 36 includes the upper, or outer, housing half shell 38 and a lower, or inner, housing half shell 48 with the upper and lower halves being secured to each other. A semi-circular slide-wire element 50 having a plurality of closely spaced resistance wire turns thereon supported by an insulating mandrel 52 is positioned within the housing 36 and has its ends fixed within molded support ears 54, 56 located on opposite sides of the housing 36. Electrically conductive wires 58, 60 are provided for effecting electrical connections to respective ends of the slide-wire element 50. A first or upper (as shown in FIG. 3) slide-wire support bar 62 is arranged to support one end of the first slide-wire arm 42. The support bar 62 is made of a relatively rigid electrically insulating material while the slide-wire arm 42 is of a flexible material which is electrically conducting, e.g., phosphor bronze. The other, free, end of the slide-wire arm 42 is attached to a brush, or contact member 64, which is arranged to engage, i.e., slideably contact, the slide-wire element 50. The other end of the support bar 62 is attached to a pivotable or rotatable cylinder 66 which may be cast integrally with the support bar 62. The cylindrical member 66 is axially mounted on a shaft 16 and is free to rotate thereon. The cylindrical member 66 is attached to the flange 24 by screws 20, 22 (not shown in FIG. 1) whereby an adjustment of the set-point control knob 28 is effective to move the combination of the bar 62, the slide-wire arm 42 and the contact brush 64 on the shaft 16 to adjust the contact of the brush 64 with the slide-wire element 50.

A second, or lower, electrically insulating support bar 68 is arranged to support the lower flexible and electrically conducting slide-wire arm 44 which has a free end connected to a second or lower slide-wire brush, or contact, means 70 which contacts the other side of the slide-wire element 50 from the brush 64. The other end of the support bar 68 is either connected to or integral with a cylindrical drive member 72 which is arranged to be driven by the motor output shaft 40A of the motor assembly 40. The drive member 72 is attached to the shaft 16 whereby the angular motion of the drive member 72 is communicated to the recording arm 14 (shown in FIG. 1) which is attached to the end of the shaft 16 by any suitable means, e.g., a set screw. The cylindrical member 72 has a lower radially outwardly extending integral flange 74 with transversely projecting ribs 76 resting on the inner surface lower half shell 48 for sliding contact therewith. The ribs 76 space the flange 74 from the inside surface of the half shell 48 while reducing the friction therebetween to minimize the torque from the motor 40 necessary to angularly deflect the bar 68 and the attached arm 44 and contact member 70.

A pair of radially outwardly projecting ears 78 are attached to, or integrally cast, with the cylindrical member 66 and have a relatively thin cross-section outwardly of the cylindrical member 66 whereby the ears 78 function as spring members or torsion bars. The outer, or free, ends of the ears 78 have a peripheral transversely raised edge 79 which is arranged to contact an adjacent inner surface of the upper half clam shell 38. In this contact position, the raised edge 79 is effective to downwardly deflect the ears 78 to apply an axial force to the cylindrical member 66. This axial force is translated to a pressure of the contact member 64 against the slide-wire element 50 by being applied through the bar 62 and arm 42 to the contact 64. A contact pressure for the contact 70 is provided in an opposite direction to the contact pressure for the contact 64 and is developed as discussed hereafter. A connecting wire 80 is provided for an electrical connection to the slide-wire arm 42 while a similar electrical connection wire 82 is provided for an electrical connection to the slide-wire arm 44. The electrical connections 58, 60 to slide-wire element 50, the electrical connections 80, 82 to the slide-wire arms 42, 44 and the electrical connections to the motor assembly 40 are brought out from the slide-wire assembly 36 in a cable 84 for connection to appropriate related circuits.

Figure 5:
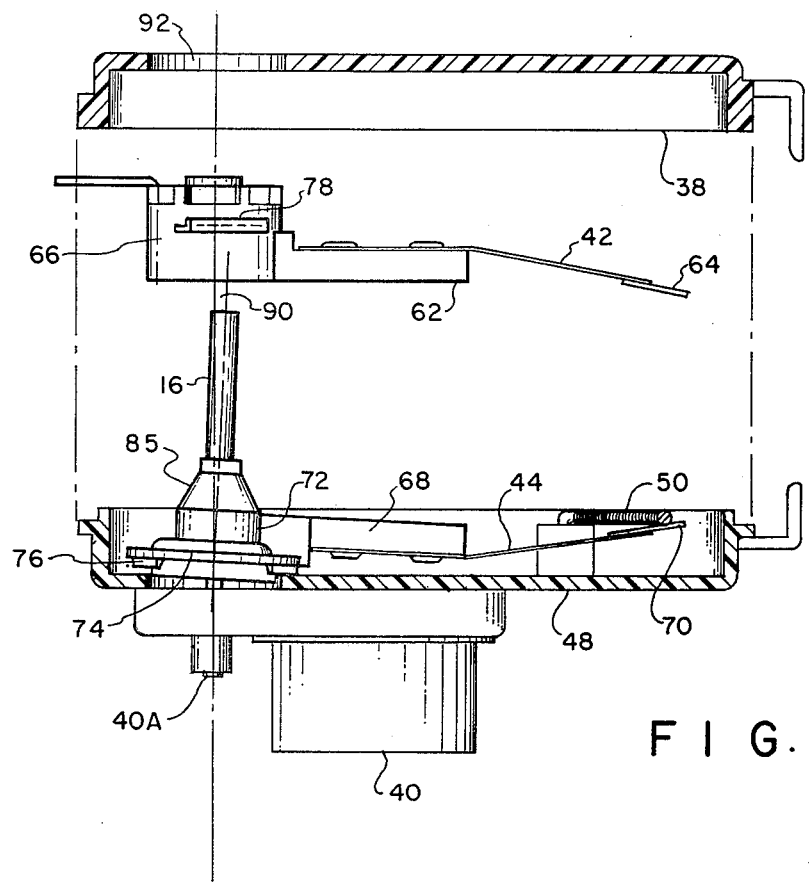
FIG. 5 is an exploded representation of the slide-wire assembly shown in FIGS. 3 and 4.
Figure 4:
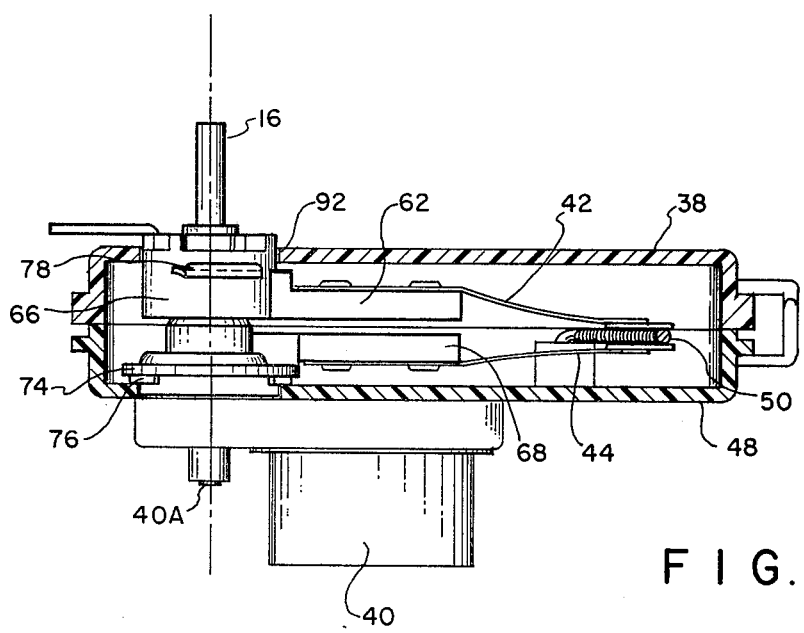
FIG. 4 is a side view of the slide-wire assembly shown in FIG. 3.

In FIG. 4 there is shown a cross-section view of the slide-wire assembly wherein the parallel relationship of the bars 62 and 68 and the contact of the contact members 64, 70 on opposite sides of the slide-wire element 50 may be seen. In FIG. 5 there is shown an exploded representation in cross-section of the slide-wire assembly as shown in FIGS. 3 and 4. In this exploded representation, it may be seen that the cylindrical member 72 terminates in a tapered cap 85 thereon. Further, in the unassembled position shown in FIG. 5, it may be seen that the shaft 16 attached to the cap 85 is tilted from a vertical center line passing through the lower half clam shell 48 and the axis of the drive shaft 40A. This tilt is effected by an initial pressure of the contact member 70 on the slide-wire element 50 transmitted through the arm 44 and the bar 68. In other words, in the assembled state of the bar 68, the arm 44 and the contact 70, the point of contact of the contact 70 with the slide-wire element 50 is below the position in which the shaft 16 would be perpendicular, i.e., have its axis parallel to the axis of the output shaft 40A. This tilt of the cylindrical member 72 is around a pivot determined by the engagement of a portion of the rib 76 on the adjacent inner surface of the clam shell half 48. Further, the tilt is achieved by providing a flexible coupling between the output shaft 40A of the motor assembly 40 and the cylindrical member 72. A preferred form of this flexible coupling is shown in FIGS. 6 and 7.

Figure 6:
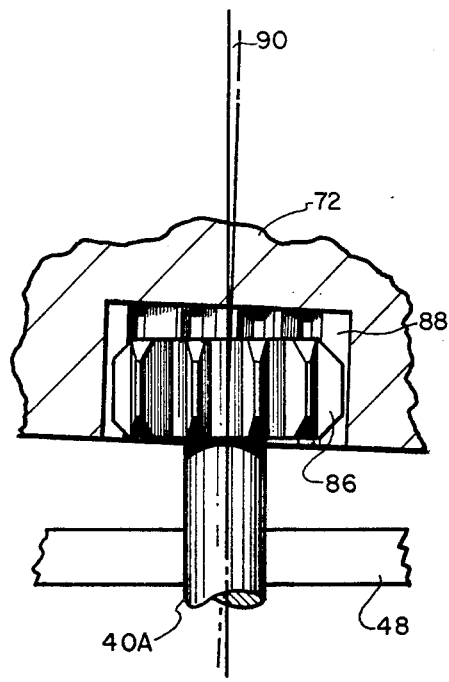
FIG. 6 is a cross-sectional view of an unaligned first position of a flexible drive coupling suitable for use in the slide-wire assembly shown in FIGS. 3, 4 and 5

As shown in FIG. 6 which is representative of the unassembled, or first, position of the cylindrical member 72, the motor assembly 40 has an output shaft 40A which is perpendicular to the clam shell 48. This motor shaft 40A passes through the lower clam shell 48 and is terminated in a transverse pinion gear 86. The gear teeth of the pinion gear 86 are arranged to mesh with an internally toothed longitudinal well 88 in the cylindrical member 72. The ends of the teeth on the pinion 86 are relieved, or chamfered, to permit a tilting of the cylindrical member 72 on the pinion 86. This tilt angle is shown as angle 90 which is the deviation of the centerline of the shaft 16 from the centerline of the output shaft 40A from the motor drive assembly 40.

Figure 7:
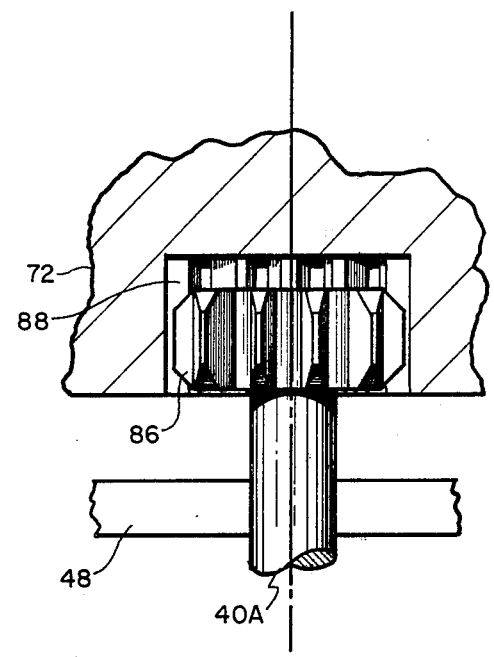
FIG. 7 is a cross-sectional view of the flexible coupling shown in FIG. 6 in a second, or aligned, position thereof.

In FIG. 7, there is shown an assembled, or second, position of the cylindrical member 72 wherein the tilt angle 90 has been reduced to zero by an alignment of the centerline of the shaft 16 with that of the output shaft 40A. In this position, the gear teeth of the pinion 86 mesh directly with the tooth indentations 88 in the cylindrical member 72. The alignment of the centerlines of the two shafts to remove the tilt 90 is achieved by a contact between the cylindrical member 62 and a hole 92 which is provided in the upper clam shell 38 to allow passage of the shaft 16 and the upper portion of the cylindrical member 66 connected to the arm 62 therethrough. Thus, the removal of the tilt angle 90 is effected by the assembly of the slide-wire structure as shown in FIG. 4 wherein the shaft 16 and cylindrical member 72 are tilted back to an aligned state of the shaft 16 and the output shaft 40A through the contact with the hole 92. This alignment is accommodated by the tapered cap 85, i.e., a sliding of the member 66 on the tapered cap 85 and is retained by the hole 92 in the upper clam shell 38.

The aligning of the shaft 16 and shaft 40A is effective to apply a greater pressure to the contact member 70 to assure a good electrical contact between the contact member 70 and the slide-wire element 50.

The mating of the upper cylindrical member 66 on the tapered cap 85 is achieved by a two diameter or stepped hole (not shown) passing through the cylindrical member 66. A first, or lower, diameter of the hole is arranged to contact the tapered cap 85 in a line contact to minimize friction therebetween whereby the driving torque exerted by the motor drive assembly 40 is not sufficiently transmitted to the cylindrical member 66 to move the contact brush 64. In order to further restrain the movement of the contact brush 64 by the motor drive assembly 40, i.e., to overcome any small torque transmitted through the line contact between the tapered cap 85 and the cylindrical member 66, these elements can be made of a low friction material, such materials being well-known in the art. Further, the set-point adjusting knob 28 can be provided with a high friction mounting to restrain any undesired motion of the flange 24 and gear teeth 26. The second, or remaining, diameter of the stepped hole is sized to allow the passage of the shaft 16 therethrough.

In the aligned position of the member 66 within the clam shell 38, the springing action of the ears 78 contacting the clam shell 38 is effective to develop a pressure which is transmitted to the contact brush 64 to assure a good electrical contact with the slide-wire member 50. Accordingly, as shown in the cross-sectional representation of FIG. 4, the bars 62, 68 are retained in a parallel state whereby the upper bar 62 transmits a downward force generated by the ears 78 to the contact brush 64 while the lower bar 68 transmits an upward force generated by the alignment of the member 72 to the contact brush 70, i.e., the forces are in opposite directions. It should be noted that from the compact nature of the slide-wire assembly 36, a second similar slide-wire assembly (not shown) may be mounted on the plate 2 and provided with a set-point pointer and a recording stylus support similar to the set-point pointer 18 and the stylus support 14 discussed above. These additional elements may be used to indicate and record on the same recording chart as the slide-wire assembly 36 while the second slide-wire assembly would be connected to a respective measuring and driving circuit.

Accordingly, it may be seen that there has been provided, in accordance with the present invention, an improved slide-wire assembly having a compact and simple structure while providing a dual slide-wire configuration.

The embodiments of the invention in which an exclusive property or privilege is claimed are defined as follows:

1. A mechanical to electrical transducer assembly comprising
 a resistor element having an elongated electrically conductive surface affording access to an electrical resistance exhibited by said element,
 a first resistor element contact means having a support arm with a first electrically conductive contact end slidably engaging said conductive surface and a pivotally mounted end opposite to said contact end,
 a second resistor element contact means having a second support arm with a second electrically conductive contact end slidably engaging said conductive surface and a pivotally mounted end opposite to said contact end arranged coaxially with said pivotally mounted end of said support arm of said first contact means,
 a first drive means for driving said first contact means, a flexible connection means arranged to connect said first drive means to said pivotally mounted end of said support arm of said first contact means, a second drive means for driving said second contact means, a second connection means connecting said second drive means to said pivotally mounted end of said support arm of said second contact means, first pressure developing means for urging said first contact means on said flexible connection means to apply a first contact pressure to said first conductive contact end, second pressure developing means for urging said second contact means to apply a second contact pressure to said second conductive contact end and clamping means for concurrently actuating said first and second pressure developing means whereby said first and second conductive contact ends are maintained in electrical contact with said conductive surface.

2. A transducer assembly as set forth in claim 1 wherein said first and second pressures are applied in opposite directions.

3. A transducer assembly as set forth in claim 2 wherein first contact end is arranged to engage said conductive surface of said resistor element on the opposite side of said resistor element from said second contact end.

4. A slide-wire assembly comprising a slide-wire resistance element, a first slide-wire contact means having a support arm with an electrically conductive contact end slidably engaging said slide-wire resistance element and a pivotally mounted end opposite to said contact end, a second slide-wire contact means having a support arm with an electrically conductive contact end slidably engaging said slide-wire resistance element and a pivotally mounted end opposite to said contact end arranged coaxially with said pivotally mounted end of said support arm of said first contact means, a first drive means for driving said first slide-wire contact means, a flexible connection means arranged to connect said first drive means to said pivotally mounted end of said support arm of said first contact means, a second drive means for driving said second slide-wire contact means, a second connection means connecting said second drive means to said pivotally mounted end of said support arm of said second contact means, first pressure developing means for urging said first contact means on said flexible connection means to apply a first contact pressure to said first contact means, second pressure developing means for urging said second contact means to apply a second contact pressure to said second contact means and clamping means for concurrently actuating said first and second pressure developing means whereby said first and second contact means are maintained in electrical contact with said slide-wire resistance element.

5. A slide-wire assembly as set forth in claim 1 wherein said first and second pressures are applied in opposite directions.

6. A slide-wire assembly as set forth in claim 5 wherein said contact end of said second contact means is arranged to engage said slide-wire element on the opposite side of said slide-wire element from said contact end of said first contact means.

7. A recorder comprising a recording means an indicating means, a slide-wire resistance element, a first slide-wire contact means having a support arm connected to said recording means and having an electrically conductive contact end slidably engaging said slide-wire resistance element and a pivotally mounted end opposite to said contact end, a second slide-wire contact means having a support arm connected to said indicating means and having an electrically conductive contact end slidably engaging said slide-wire resistance and a pivotally mounted end opposite to said contact end arranged coaxially with said pivotally mounted end of said support of said first contact means, a first drive means for driving said first slide-wire contact means, a flexible connection means arranged to connect said first drive means to said pivotally mounted end of said support arm of said first contact means, a second drive means for driving said second slide-wire contact means, a second connection means connecting said second drive means to said pivotally mounted end of said support arm of said second contact means, first pressure developing means for urging said first contact means of said flexible connection means to apply a first contact pressure to said contact means, second pressure developing means for urging said second contact means to apply a second contact pressure to said second contact means and clamping means for concurrently actuating said first and second pressure developing means whereby said first and second contact means are maintained in electrical contact with said slide-wire means.

8. A recorder as set forth in claim 7 wherein said first and second pressures are applied in opposite directions.

9. A recorder as set forth in claim 6 wherein said contact end of said second contact means is arranged to engage said slide-wire element on the opposite side of said slide-wire element from said contact end of said first contact means.

* * * * *